Patented Jan. 22, 1935

1,988,959

UNITED STATES PATENT OFFICE 1,988,959

PAINT AND METHOD OF MAKING THE SAME

Philip H. Pennell and Charles H. Draper, Manheim Township, Lancaster County, Pa., assignors to Armstrong Cork Company, Lancaster, Pa., a corporation of Pennsylvania No Drawing. Application November 25, 1931
Serial No. 577,387

6 Claims. (Cl. 134—26)

It is an object of our invention to produce a varnish that will not penetrate the surface to which it is applied. It is a further object of our invention to provide a varnish which, when incorporated in a paint, will prevent any substantial penetration by the paint into the surface to which the paint is applied. It is a further object of our invention to provide a paint that will dry to a glossy finish. It is a further object of our invention to produce a paint which when dried will be flexible, durable and alkali resistant.

Our invention is particularly adapted for use with surface coverings of the felt base type. Surface coverings of this type consist generally of a felt base having a seal coat and a layer of decorative paint. It is essential for the decorative paint to have a pleasing appearance. Our paint retains its appearance after drying because the oil content of the paint is not diminished.

Ordinary seal coats do not cover the surface of the felt with a solid film. Generally the seal coat is more or less porous. Accordingly, when the decorative paint coating is applied to the seal coat, part of the oil of the paint coat permeates the seal coat and is absorbed thereby. In some cases, the seal coat has robbed the paint coat of nearly one-half its total oil content. The absorption of the oil from the paint coat by the seal coat results in serious defects in the final product.

The oil in the paint is responsible entirely for the glossy finish, and, to a great extent, for the flexibility and durability of the paint. Accordingly, paint that has lost some of its oil before drying will have the appearance of flat paint. The paint film will also have a tendency to crack when it has lost any appreciable amount of oil.

Attempts have been made to keep sufficient oil in the paint to avoid obtaining an unsatisfactory product. It is possible, of course, to minimize the porosity of the seal coat. However, changes of this nature are too expensive for commercial practice. Another method which has been tried is that of putting sufficient oil in the paint so that even though the seal coat does permit the same quantity of oil to be withdrawn from the paint by the seal coat, that sufficient oil is left in the paint coat to retain all its desirable characteristics. This method was unsuccessful because the additional oil required caused the paint to flow too readily. The difficulty of controlling the flow made it impossible to obtain a satisfactory finish.

We have discovered that certain heavily heat polymerized oil-resin bodies may form a varnish that will prevent the penetration of paint in which it is incorporated into the material covered by the paint. As an example we may use 300 pounds of resin, 114 pounds of drying oil and 414 pounds of thinner. The resin may be any phenolic resin or any alkyd resin having an acid number not higher than 20. The resin we prefer to use is that formed by heating a phenol, rosin and formaldehyde in an autoclave until it is resinified. Glycerine is then added and the free rosin is esterified.

The oil we prefer to use is China wood oil but we may use linseed, soya bean, or any other drying oil. The mixture of resin and drying oil is heated to 565° F. until a clear solution is obtained and is then cooled to 450° F. The polymerization is carried to a practical maximum consistent with production of a satisfactory varnish. The polymerization is stopped just short of the point at which the resin and drying oil mixture would become a solid gel. This point is determined by dipping a rod in the mass and allowing it to flow from the rod. When the mass forms a string on the end of the rod the polymerization is sufficiently complete. The thinner is then added. We prefer to use volatile thinners such as petroleum distillate or turpentine.

We may use a mixture of linseed oil and China wood oil for the varnish. In this case we take a mixture of 100 pounds of linseed oil and 100 pounds of China wood oil and heat the mass to 565° F. until it will form a gel. The heating is stopped just before the gel solidifies completely. The resultant gel, which is almost completely solid, may be regenerated to a flowable condition by the addition of a small quantity of litharge or lead acetate. We prefer to add a paste consisting of 2 pounds of litharge and 4 pounds of linseed oil. The mass is stirred and the heat is continued until a suitable viscosity is obtained. Then 200 pounds of raw linseed oil is added to the mass to chill it and prevent further polymerization.

This oil is then heated with resin to about 550° F. until a clear solution is obtained. The resin must not be too strongly acid because the high acid resins tend to destroy the colloidal structure of the gelled mixture of oils. The use of resins having an acid number higher than 20 also has a tendency to decrease the alkali resistance of the paint. We prefer to use a resin having an acid number of about 15 or less. After the clear solution of oil and resin is obtained it is cooled to about 450° F. The mixture is then thinned with volatile thinners to form a varnish. The oil is used in the same proportions as in the first example.

In the preceding example it will be noted that the mixture of oil and resin does not require heating above 550° F. This is true because the China-wood oil present in the mixture was subjected to a temperature of 565° F. when it was heated with the linseed oil. It is necessary for all the China-wood oil used in the varnish to be subjected to a temperature of approximately 565° F. some time during the process in order to prevent the formation of a dull or wrinkled finish in the dried paint film. We may mix the China-wood oil with the linseed oil at a temperature of less than 565° F., but if we do so, we must then heat the mixture of the oils and resin to 565° F. We prefer to heat the mixture of oils without the resin to the higher temperature because if that mixture is heated too far, we may add more litharge to keep the mixture liquid. If the mixture of oils and resin is heated too far, it will solidify. No practical means is known for liquefying the mixture of oils and resin after it has solidified.

It is essential that the amount of litharge or lead acetate added to the gelled mixture of oils should be sufficiently small so as not to destroy the colloidal structure of the gel to a greater extent than is necessary to allow the mixture to flow. Apparently the colloidal condition of the mixture of oils is such that when a paint containing our varnish is applied over a porous seal coat the colloidal gel particles that have not been regenerated to a liquid collect at the pores of the seal coat and close them, so that the absorption of oil from the paint by the seal coat is substantially prevented. The drying of the paint film without allowing any substantial absorption of the oil by the seal coat insures a glossy finish on the surface covering to which the paint is applied. The glossy finish eliminates the necessity of subsequent lacquering of the surface covering.

A suitable paint embodying our new varnish may comprise the following ingredients:

|  | Pounds |
|---|---|
| Pigments | 100 |
| Oil | 25 |
| Varnish | 15 |
| Light boiled linseed oil | 15 |
| Volatile thinner | 3 |

The oil we prefer to use is the mixture of linseed oil and China-wood oil treated in the manner described above. This oil does not contain any resin. The oil also has a very low lead content. This is of particular advantage in that the lead causes a slight amount of yellowing in the dried paint film. We have eliminated substantially all of this discoloration by reducing the lead content of the paint. The varnish may be that formed by either of the examples described above.

Our paint may be applied to surface coverings of the felt base type without any appreciable trouble. It is superior to the ordinary paints which have been used for this purpose in flexibility, gloss, alkali resistance, abrasion resistance and drying time. The increasing of the gloss and alkali resistance does not affect the printing properties of the paint.

By the term "unstable dispersion", as used in the claims, we mean a dispersion in which flocculation is imminent.

Although we have described certain specific embodiments of our invention it will be understood that details thereof may be modified without departing from the spirit or scope of our invention. Accordingly, we do not desire to be restricted to the specific details of our invention except as set forth in the appended claims.

We claim:

1. In the method of making a paint for application to porous surfaces such as felt base surface coverings, the steps including polymerizing a completely liquid phase of a mixture of drying oils including China-wood oil until a gel is formed; regenerating the gelled mass to flowable condition with a peptizer in a quantity insufficient to completely destroy the colloidal structure of the gel; heating the regenerated mass with synthetic resin having an acid member of not more than about 20 to form an unstable dispersion of an oil-resin complex in the original liquid phase; and incorporating pigment therein.

2. In the method of making a paint for application to porous surfaces such as felt base surface coverings, the steps including polymerizing a completely liquid phase of a mixture of drying oils including China-wood oil until a gel is formed; regenerating the gelled mass to flowable condition with a peptizer in a quantity insufficient to completely destroy the colloidal structure of the gel; heating the regenerated mass with phenol-formaldehyde-glycerin resin having an acid number of not more than about 20 to form an unstable dispersion of an oil-resin complex in the original liquid phase; and incorporating pigment therein.

3. In the method of making a base for a paint adapted for application to porous surfaces such as felt base surface coverings, the steps including polymerizing a completely liquid phase of a mixture of drying oils including China-wood oil until a gel is formed; regenerating the gelled mass to flowable condition with a peptizer in a quantity insufficient to completely destroy the colloidal structure of the gel; and heating the regenerated mass with synthetic resin having an acid number of not more than about 20 to form an unstable dispersion of an oil-resin complex in the original liquid phase.

4. As an intermediate product, a paint base comprising a virtually unstable dispersion of gel particles of an oil-resin complex consisting of a polymerized mixture of drying oils, including China-wood oil, and synthetic resin having an acid number of not more than about 20, in a liquid phase of sufficient polymerized drying oils, including China-wood oil, to permit flow and partial precipitation of the complex; produced by the method of claim 3.

5. A paint for application to surface coverings of the felt-base type having a porous seal coat, comprising a virtually unstable dispersion of gel particles of an oil-resin complex consisting of a polymerized mixture of drying oils, including China-wood oil, and synthetic resin having an acid number of not more than about 20, in a liquid phase of polymerized drying oils, including China-wood oil; and pigment; produced by the method of claim 1.

6. A paint for application to surface coverings of the felt-base type having a porous seal coat, comprising a virtually unstable dispersion of gel particles of an oil-resin complex consisting of a polymerized mixture of drying oils, including China-wood oil, and phenol-formaldehyde-glycerin resin having an acid number of not more than about 20 in a liquid phase of polymerized drying oils, including China-wood oil; and pigment; produced by the method of claim 2.

PHILIP H. PENNELL.
CHARLES H. DRAPER.

CERTIFICATE OF CORRECTION.

Patent No. 1,988,959. January 22, 1935.

PHILIP H. PENNELL, ET AL.

It is hereby certified that error appears in the printed specification of the above numbered patent requiring correction as follows: Page 2, second column, line 10, claim 1, for "member" read number; and that the said Letters Patent should be read with this correction therein that the same may conform to the record of the case in the Patent Office.

Signed and sealed this 26th day of March, A. D. 1935.

(Seal)

Leslie Frazer
Acting Commissioner of Patents.